United States Patent [19]

Nolan

[11] Patent Number: 5,009,540
[45] Date of Patent: Apr. 23, 1991

[54] FASTENING MEANS

[76] Inventor: Vernon E. L. Nolan, 16 Gosse Road, Padbury, Western Australia, Australia

[21] Appl. No.: 348,669
[22] PCT Filed: Oct. 23, 1987
[86] PCT No.: PCT/AU87/00358
  § 371 Date: Apr. 25, 1989
  § 102(e) Date: Apr. 25, 1989
[87] PCT Pub. No.: WO88/03231
  PCT Pub. Date: May 5, 1988

[30] Foreign Application Priority Data

Oct. 27, 1986 [AU] Australia .................... PH8699

[51] Int. Cl.⁵ .................. B25G 3/00; A47H 13/00
[52] U.S. Cl. .................... 403/405.1; 256/23; 160/392; 160/395; 160/327
[58] Field of Search .......... 256/24, 23; 403/405.1; 160/392, 395, 327

[56] References Cited

U.S. PATENT DOCUMENTS

| | | | |
|---|---|---|---|
| 2,496,910 | 2/1950 | Fridolph | 160/395 |
| 3,757,479 | 9/1973 | Martinez | 160/392 X |
| 3,805,873 | 4/1974 | Bloomfield | 160/392 |
| 4,057,095 | 11/1977 | Hirota | 160/395 X |
| 4,144,622 | 3/1979 | Yoshinari | 160/395 X |
| 4,267,876 | 5/1981 | Bloomfield | 160/392 |
| 4,337,815 | 6/1982 | Lindstrom . | |
| 4,452,294 | 6/1984 | Fukuchi | 160/395 X |
| 4,539,734 | 9/1985 | Messerschmitt | 160/392 X |
| 4,638,532 | 1/1987 | Yang et al. | 160/395 X |
| 4,769,877 | 9/1988 | Conley | 160/395 X |
| 4,799,299 | 1/1989 | Campbell | 160/392 X |

FOREIGN PATENT DOCUMENTS

| | | |
|---|---|---|
| 43065/68 | 3/1970 | Australia . |
| 88485/82 | 9/1982 | Australia . |
| 898594 | 3/1984 | Belgium . |
| 1035536 | 8/1978 | Canada . |
| 2433638 | 7/1974 | Fed. Rep. of Germany . |
| 2317537 | 2/1977 | France . |
| WO85/01088 | 3/1985 | PCT Int'l Appl. . |
| WO85/02890 | 6/1985 | PCT Int'l Appl. . |
| 2158141 | 11/1986 | United Kingdom . |

Primary Examiner—Randolph A. Reese
Assistant Examiner—Carol I. Bordas
Attorney, Agent, or Firm—Burns, Doane, Swecker & Mathis

[57] ABSTRACT

A fastener for sheet material includes a fork member mounted on a fixture and having a pair of outwardly diverging arms, and a keeper member which is placeable in a locking position between the arms. A portion of sheet material disposed between the fork member and the keeper member is held therebetween even when a tensioning force is applied to the portion, since the portion thereby applies a torsional force to the keeper member to bias the keeper member into a locking position within the fork member.

11 Claims, 5 Drawing Sheets

FASTENING MEANS

This invention relates to a fastening means having particular utility in the fastening of flexible sheeting material, such as plastic sheeting, to a fixture. Moreover, the invention finds particular, although not exclusive, application to fixing plastic sheeting to a framework so as to form coverings for green houses, cloches, or other such structures.

BACKGROUND ART

With respect to the aforementioned application, previously known methods of fixing flexible sheeting to a framework have involved forming a hem around the perimeter of the sheeting and fastening the hem to the framework by means of nailed battens or by the use of dowels and twine. With regard to the latter, wooden dowels are passed through the hem at spaced apart locations and twine is firstly laced through the dowels and subsequently fixed to the frame work by means of staples. Both of these methods have the disadvantages. In the case of nailed battens, the sheeting has a tendency to tear, and the battens have a tendency to work away from the framework, particularly in windy conditions. In the case of dowels and twine, tensile forces within the sheeting, over a period of time, have a tendency to stress the lacing and eventually cause the staples to pull out, thereby releasing the sheeting. Additionally, the sheeting material often times tears through the dowels when subjected to extremely large transient tensile forces such as do arise in windy conditions, causing not only the release of the sheeting but also damage to the sheeting.

In order to overcome the disadvantages of the aforementioned methods of fastening sheeting, several products have been proposed which utilize a channel member and a mating wedge or clip member, which are capable of being deformedly interconnected to form a joint. In these arrangements, one member is fixedly mounted to the greenhouse or cloche framework, and the sheeting is clamped to this member by disposing it between the respective members of the joint prior to interconnection and subsequently pressing the other member into engagement with the fixed member so as to clamp or pin the sheeting between the members. Examples of this type of fastening are disclosed in prior patent specification numbers AU-43065/68, DE-2433638, AU-33920/84, AU-38379/85 and BE-98594.

Each of the prior art fastening devices disclosed in these specifications relies upon the fixing of the channel member, usually formed of aluminium, to the framework which supports the sheeting. The sheeting is then anchored by pushing the wedge or clip, usually formed o plastic material, into the channel with the sheeting interposed between the channel and the clip. Consequently, the channel member and/or clip is required to be deformed to subsequently allow frictional engagement between the members and thus the formation of the joint.

The types of frictional fastening suffer from several disadvantages as a result of their intrinsic design. Moreover, these types of fastening for their fastening ability rely upon the frictional force created between the interconnected members being greater than any tensile or tensioning force applied to the sheeting, such that these forces are in direct opposition to each other. It has been found, however, that in gusty wind conditions where relatively large and repetitive tensile forces are applied to the sheeting material, the wedge or clip members have a tendency to be forced apart due to the tensile forces on the sheeting providing a generally transverse force component within the confines of the channel, directly against the wedge or clip member, due to the sheeting material in the vicinity of the channel being displaced from the general plane of the sheeting which is actually subjected to the tensile forces. Furthermore, due to these devices relying upon deformation of either or both the channel member and wedge or clip member, such a type of fastening is not conducive to repeated usage on the same portion of sheeting, since the sheeting material in the vicinity of the channel is subjected to a relatively high degree of stress during the interconnecting operation. Thus repeated release and re-application of the fastening would have a tendency to cause severe wear of that portion of the sheeting retained within the joint. Additionally, the release of the joint would be a relatively difficult operation since the application of a force greater than the frictional force maintaining the joint, would need to be applied to the wedge or clip member in order to ensure its release.

DISCLOSURE OF INVENTION

It is an object of the present invention to provide a fastening means for sheeting material which can facilitate the release and re-fastening of the material.

It is a preferred object of the present invention to provide a fastening means for sheeting material which applies a holding force to the material proportional to any outwardly direct tensile force applied to the material.

In accordance with one aspect of the present invention, there is provided a fastening means for sheeting material comprising:

a fork member to be mounted to a fixture, said fork member having a pair of outwardly diverging arms joined at a common junction, one arm being provided with an inwardly directed hook means, distally disposed therealong relative to said junction; and an elongate keeper member to be disposed within said fork member between said arms and being capable of adopting a locking position therein, said keeper member having opposing ends for respectively engaging the inner sides of the opposing arms when in the locking position such that one end if adapted to engage and be retained by said hook means and the other end is adapted to be confined between said arms towards said junction so as to forcedly engage the inner side of the other arm in response to the application of a torsional force to said keeper.

said keeper member having a longitudinal extent between said ends greater than the maximal spacing between said arms but less than the distance between said hook means and said junction;

wherein a portion of sheeting material disposed between said keeper member and said fork member may be fastened in response to a tensioning force applied to that portion of the material adjacent the other arm by virtue of said material applying a moment to said keeper, biasing said keeper into said locking position.

Preferably, the keeper member has a transverse extent less than said maximal spacing between said arms to facilitate removal of the keeper member from within the confines of the fork member in the absence of said tensioning force being applied to said material.

Preferably the fastening means includes a biasing means to continually bias the one end of said keeper member into engagement with the hook means of said fork member thereby maintaining said keeper member within the confines of said fork member.

Preferably, the other arm of the fork member is formed with a substantially planar inner side terminating abruptly at the distal end of the other arm to enable a portion of sheet material disposed adjacent to said other arm to extend continuously with the general plane of said side beyond the distal end of said other arm.

BRIEF DESCRIPTION OF DRAWINGS

The invention is further described in the following specific embodiments thereof. The description is made with reference to the accompanying drawings wherein.

BEST MODE FOR CARRYING OUT THE INVENTION

Figure 1:
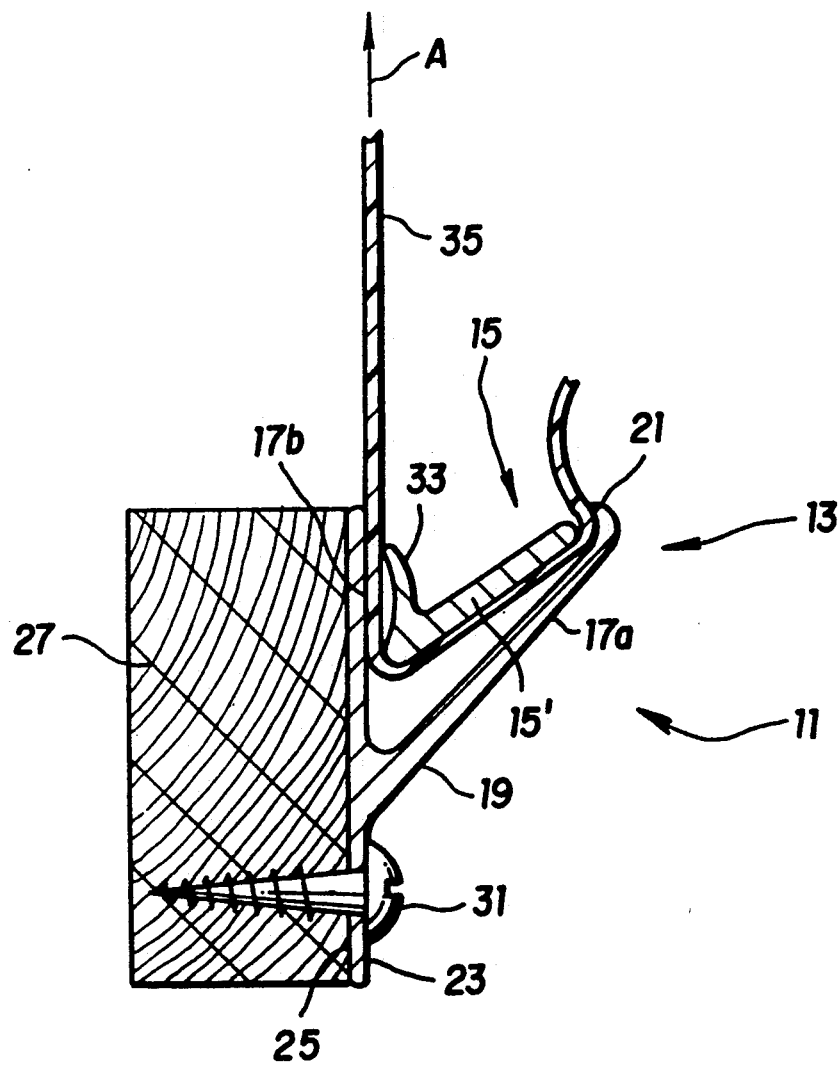
FIG. 1 is a cross-sectional end view of the fastening means in accordance with a first embodiment.

The first embodiment is directed towards a fastening means for fastening flexible sheeting material in the form of a plastic membrane to a frame work for a green house, whereby the plastic membrane provides a transparent cover to the greenhouse.

The fastening means 11 essentially consists of two members, one being a fork member 13 and the other being a keeper member 15.

The fork member is formed with a pair of outwardly diverging arms 17a, 17b which are joined at a common junction 19. One arm 17a is provided with an inwardly directed hook means 21 at the distal end thereof relative to the junction 19. The other arm 17b has a generally planar inner side which terminates abruptly at the distal end thereof relative to the junction 19. A mounting flange portion 23 projects from the junction 19 in a generally opposite direction to the other arm. The flange portion 23 combines with the other arm 17b to define a planar outer mounting side 25 for flush mounting the fork member to a structural member 27 of the framework for the greenhouse. A series of apertures 29 are provided at regular spacings along the flange portion 23 to facilitate mounting the fork member to the structural member by a conventional fastener such as a self tapping screw 31.

Figure 2:
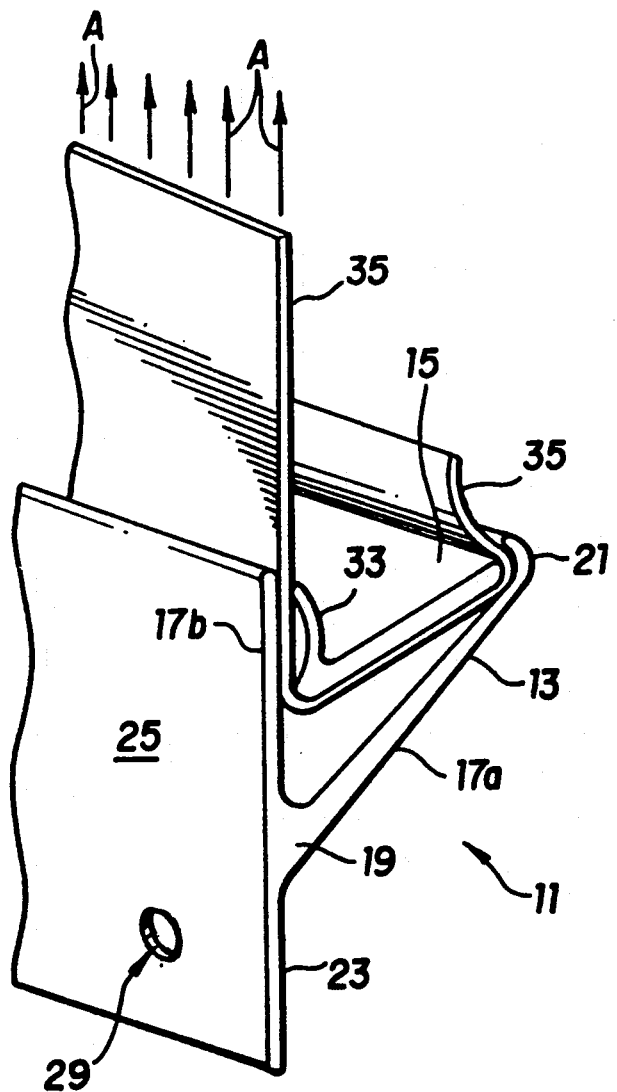
FIG. 2 is a perspective view of the fastening means shown at FIG. 1.

The keeper member 15 includes a body 15' which is substantially planar, as shown in FIGS. 1 and 2, and which is elongated in section and is formed with opposing for respectively engaging the inner sides of the opposing arms 17a, 17b of the fork member. That is, one end 15a is adapted to engaqe the inner side of the one arm 17a and moreover, be retained by the hook means 21, and the other end 15b is adapted to lodge between the arms proximate the junction 19, and, when appropriate, engage the inner side of the other arm 17b. Accordingly, the distance between the ends 15a, 15b of the keeper member 15 is generally greater than the maximal spacing between the arms 17a, 17b, but is less than the distance between the hook means 21 and the junction 19 to permit the member to adopt a locking position to be described in more detail later.

The keeper member 15 is provided with a biasing means in the form of a resilient finger 33. The finger 33 projects outwardly from the body of the keeper member proximate the other end 15b. The finger 33 extends a distance from the other end 15b which is generally less than the maximal spacing between the arms 17a, 17b to enable removal of the keeper member 15 from within the confines of the fork member 17. The finger is capable of lateral deflection towards the body of the keeper member to effectively apply an outward biasing force thereon. Consequently, the keeper member may be inserted into the confines of the fork member with the finger 33 disposed on the upperside of the keeper member so as to extend outwardly relative to the opening of the fork member, and be brought into a locking position. Moreover, the one end 15a of the keeper member is brought into and maintained in engagement with the hook means 21 of the member and the other end 15b is disposed between the arms proximate the junction 19. In this position, the finger 33 is deflected laterally by the adjacent location of the inner side of the other arm 17b and thus applies a resulting biasing force to the body of the keeper member causing the one end 15a of the keeper member to repose against the inner side of the one arm 17a of the fork member. Accordingly the one end 15a engages the hook means 21 in response to any outward movement of the keeper member from within the fork member.

In order to remove the keeper member from the locking position, it is simply necessary to align the body of the keeper member with the opening between the arms and release one end 15a of the keeper member from the hook means 21. This can be achieved by simply disposing the other end 15b of the keeper member in close engagement with the junction 19 and bodily deflecting the keeper member away from the arm 17a, in cases where access to the one end 15a is restricted by the end of the hook means, or by simply pulling the one end 15a away from the hook means in cases where access is not so restricted, so that in either case the one end 15a is spaced laterally from the hook means 21. Subsequently the keeper member can be removed from this position by passing it through the opening provided between the arms 17 whilst maintaining its aligned attitude. Such disposition of the keeper member is caused by deflection of the finger 33 relative to the body of the keeper member by a force greater than the biasing force applied by the finger.

Now describing the operation of the fastening means, the end portion of the plastic membrane 35 which is desired to be fastened, is positioned so as to overlie the opening between the arms 17 of the fork member. The keeper member 15 is then positioned along this opening engaging the plastic membrane on the opposite side to that which overlies the fork member. Thus, the plastic membrane is interposed between the fork member and the keeper member. The other end of the keeper member, is then directed inwardly through the opening and into the confines of the fork member by bodily pressing the keeper member and so causing the distal end of the finger 33 to engage the inner side of other arm 17b with the plastic membrane interposed therebetween. Eventually, the one end 15a of the keeper member will enter the confines of the fork member and engage the inner side of the arm 17a with the plastic membrane interposed therebetween. At this stage, the finger 33 will be deflected inwardly by the action of the other arm 17b biasing the one end 15a of the keeper member into engagement with the one arm 17a and consequently, into engagement with the hook means 21. At this position, the keeper member will be effectively locked within the confines of the fork member, and be prevented from escaping from this confinement by the provision of the hook mean 21.

Consequently, the plastic membrane enters the confines of the fork member adjacent the inner side of the other arm 17b so as to extend generally contiguously with the inner side of the other arm 17b The membrane further extends around the outer side of the keeper member to generally envelope the same within the confines of the fork member.

Thus, if any outwardly directed tensioning force is applied to the plastic membrane as represented by the arrows A, an effective moment will be applied to the keeper member causing the one end 15a of the member to engage more securely with the hook means 21 and the other end 15b to engage more securely with the inner side of the other arm 17b. If this tensioning force increases, the moment applied to the keeper member will be increased causing a greater forced engagement between the other end 15b of the keeper member and the other arm 17b. Consequently, the fastening force applied by the keeper member to the membrane increases with an increase in tensioning forces on the membrane. Similarly, a reduction in the tensioning force on the membrane causes a reduction in the holding or clamping force provided by the fastening means, i.e., the fastening force is proportional to the tensioning or tensil force in the membrane.

Accordingly, the present invention has the advantage that a fastening force is only applied to the membrane at those times when the membrane requires it, i.e. when under tension, and thus reduces the degree of wear upon the components of the fastening means and the membrane itself due to the impermanence of the holding forces applied between the members and the membrane.

Additionally, release of the fastening of the membrane is facilitated by removing the keeper member from within the confines of the fork member in the manner previously described. Consequently, repeated use of the fastening means is allowed and indeed is facilitated by the simple process required in releasing the keeper member without the imposition of significant stresses upon the plastic membrane retained thereby.

The second embodiment is substantially similar to the previous embodiment, except that the keeper member is of a slightly different configuration.

In the description of this embodiment, the same reference numerals are used for identifying features of the fastening means consistent with both embodiments.

Figure 3:
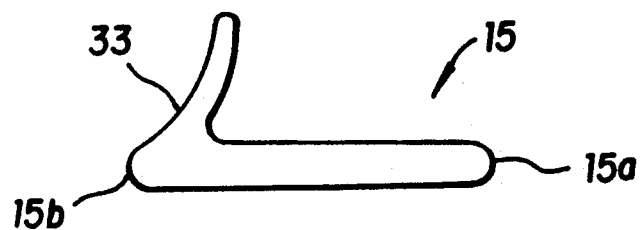
FIG. 3 is an end view of the keeper member.
Figure 4:
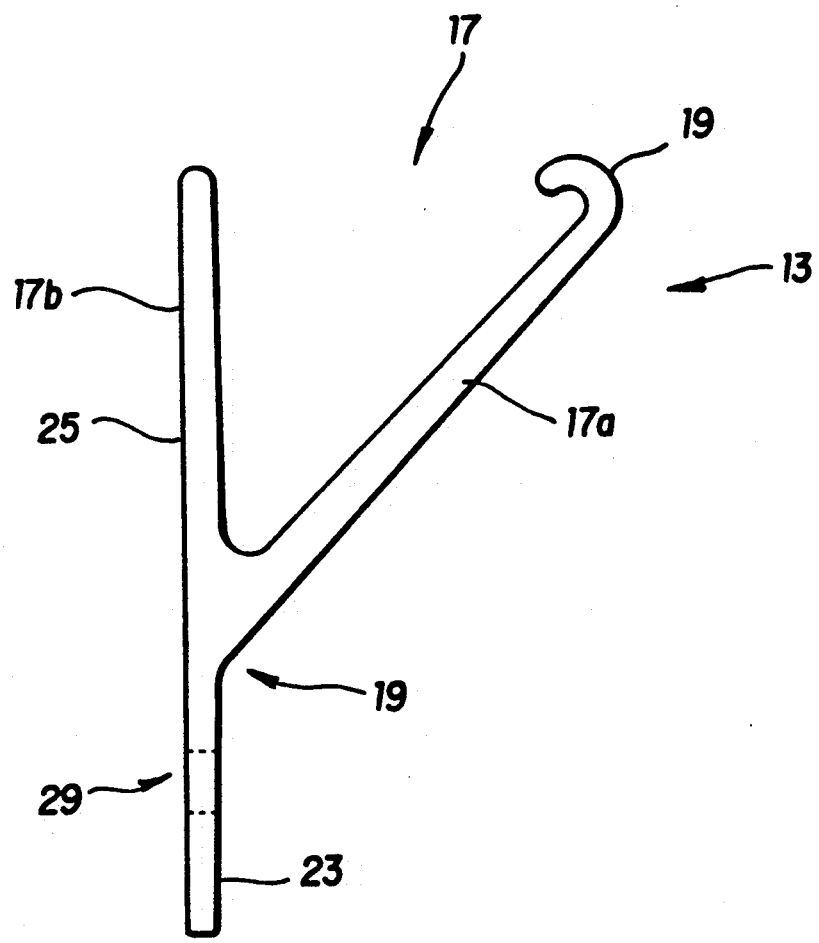
FIG. 4 is an end view of the fork member.
Figure 5:
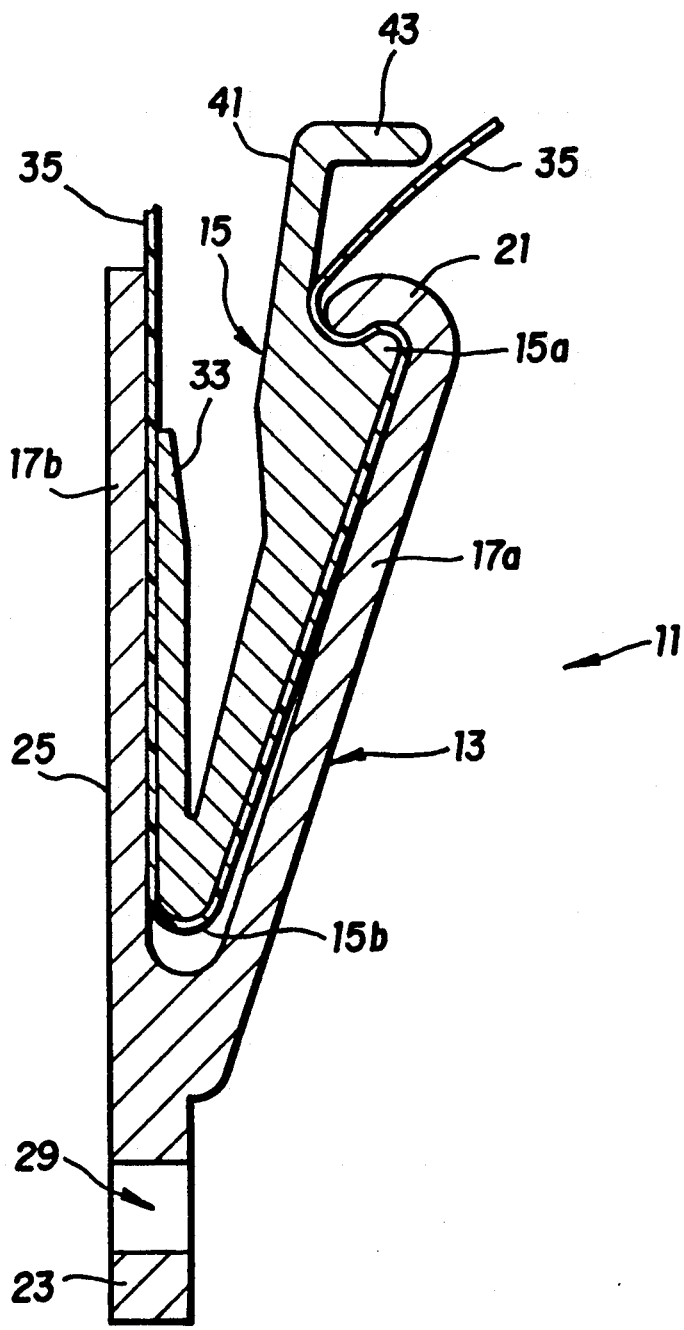
FIG. 5 is a cross-sectional end view of the fastening means in accordance with a second embodiment.

As shown at FIG. 3 of the drawings, the keeper member 15 of the present embodiment is of a more pronounced angular configuration so as to be accommodated with a fork member 13 having arms 17a, 17b of a closer spacing.

The keeper member 15 is further formed, with an integral wing 41 which projects outwardly from the body of the keeper member on the same side as does the finger 33. The wing 41, however, is disposed towards the one end 15a of the keeper member and projects outwardly from within the confines of the fork member beyond the opening, when the keeper member is disposed therein. The wing 41 terminates with an outwardly projecting lip 43, which is disposed to generally overlie the hook means 21 so as to shield any exiting membrane between the hook means and the keeper member. Consequently, the stressed portion of the membrane is shielded from exposure to the external environment and in particular, from ultra violet radiation, thereby mitigating its tendency to otherwise debilitate.

The wing 41 provides the additional benefit of a handle which may be grasped to depress the keeper member into the confines of the fork member, enabling disengagement of the one end 15a of the keeper member from the hook means 21 and consequently permitting disengagement of the one end 15a from the inner side of the one arm 17a by deflecting the body of the keeper member against the finger 33. Hence, removal of the keeper member from the fork member is facilitated, and use of the keeper member is enabled in fork members having restrictive openings designed for the application of relatively high fastening forces.

The third embodiment is essentially an extension of the first embodiment, whereby a fastening means is provided having dual fork members which are oppositely disposed and adapted to receive keeper members so as to provide a connector for interconnecting the ends of two separate pieces of sheeting both of which are capable of being subjected to tensioning.

Figure 6:
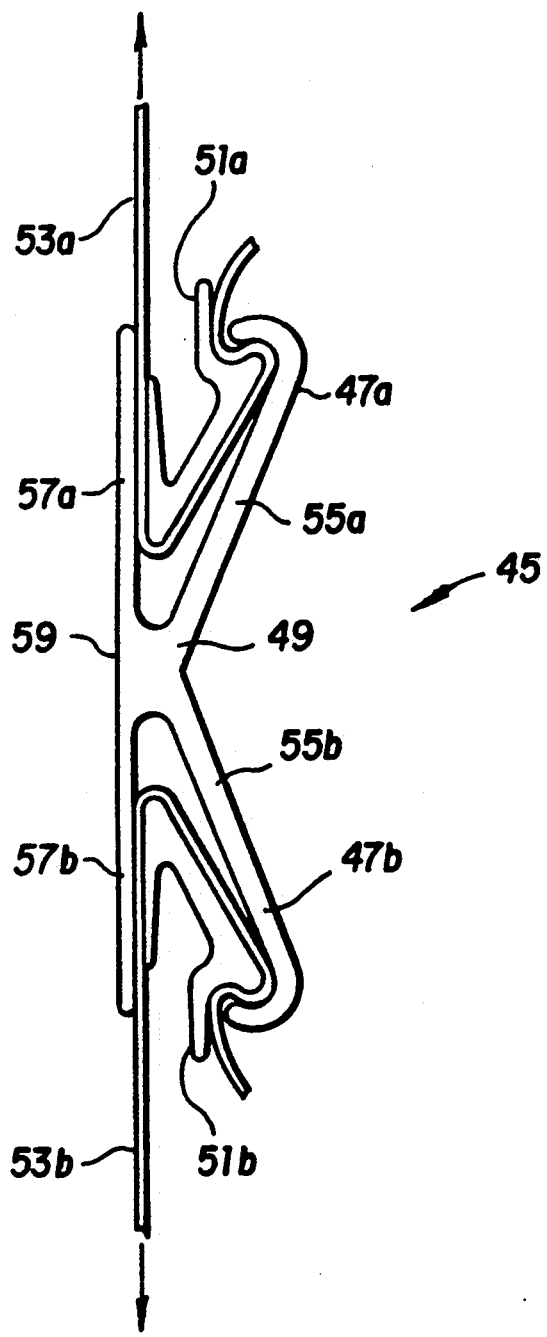
FIG. 6 is an end view of the fastening means in accordance with a third embodiment.

As shown at FIG. 6 of the drawings, the fastening means 45 comprises a pair of oppositely disposed fork members 47a and 47b which are joined together at a common junction 49. Each fork member 47 is of essentially the same design of the fork member of the first embodiment, and is adapted to receive a keeper member 51 in a locking position to fasten the end of a portion of sheeting within the confines of the fork member. Thus, one fork member 47a is adapted to receive the keeper member 51a and so fasten the portion of sheeting 53a in the same manner as described in the previous embodiments, and the other fork member 47b is adapted to receive the keeper member 51b to fasten the portion of sheeting 53b therein.

The particular disposition of the diverging arms of the fork members is such that the one arms 55a, 55b which terminate with the hook means extend out from the junction 49 towards the same side of the fastening means, and the other arms 57a, 57b extend outwardly in opposite directions from the junction 49 at the other side of the fastening means. Furthermore, the other arms 57a and 57b of the respective fork members are coplanar so as to define a planar outer side face 59 along the other side of the fastening means to facilitate mounting of the fastening means to the framework.

Consequently, attachment of the ends of two separate portions of sheeting may be achieved by fastening the respective ends of the sheeting 53 to the respective fork members in the manner previously described in the preceding embodiments.

It should be noted that an important feature of the aforementioned embodiments is that the fastening means described therein, provides a fastening force which varies with the tensioning or pulling force applied by the sheeting material and moreover, provides fastening force which is directly proportional to this. Accordingly, by adjusting the proportions of the arms of the fork member and varying the angle of the keeper member, it is possible to multiply the fastening force by the resultant lever action applied by the keeper member upon the sheeting material. Furthermore, when there is no tensioning force, the fastening force reduces markedly to that merely applied by the resilient finger.

In addition, it should be noted that the spring action provided by the finger is only necessary to maintain the keeper member in place when there is no tension on the sheeting material. Hence, the provision of the biasing means can be dispensed within those applications where there is always some tension in the sheeting material being fastened.

Accordingly, it should be appreciated that the scope of the present invention is not limited to the particular embodiments herein described and that alternative arrangements of the fork member and keeper member can be provided without departing from the spirit of the invention.

The claims defining the invention are as follows:

I claim:

1. A fastening means for fastening sheet material to a fixture wherein the sheet material is subject to a varying tensile force, comprising:
    a fork member for mounting to the fixture, said fork member including a pair of outwardly diverging arms joined at a common junction, one of said arms including a hook means thereon spaced from said junction; and
    means for fastening the sheet material within said fork member such that the fastening force applied to the sheet material is proportional to the tensile force in the sheet material, said means for fastening within said fork member including a keeper member having a substantially planar body, said substantially planar body having two ends, one end for holding the sheet material against said hook means and an other end for holding the sheet material against the inner side of the other of said arms such that a fastening force is applied to the sheet material by said other end of said body in proportion to the tensile force in the sheet material, a distance between said ends of said body being greater than a maximal spacing between said arms, and being less than a distance between said hook means and said common junction, so that said keeper may adopt a locking position wherein said keeper is pulled in the same direction as the tensile force in the sheet material, thereby causing said ends of said body to apply the fastening force.

2. A fastening means as claimed in claim 1, wherein said keeper member includes a resilient, outwardly extending finger integral with said body.

3. A fastening means as claimed in claim 2, wherein said finger extends a distance from said other end of said body which is less than a maximal spacing between said arms to enable removal of said keeper member from said fork member.

4. A fastening means as claimed in claim 1, further comprising:
    means for fastening said fork member to the fixture.

5. A fastening means as claimed in claim 1, wherein said other arm of said fork member is formed with a substantially planar inner side to enable the sheet material to extend generally contiguously with said inner side of said other arm.

6. A fastening means as claimed in claim 1, wherein said keeper member includes a wing member projecting outwardly from said body to facilitate removal of said keeper member from said fork member.

7. A fastening means for fastening portions of sheet material to a fixture wherein the sheet material portions are subject to varying tensile forces, comprising:
    a fork member for mounting to the fixture, said fork member including two pairs of outwardly diverging arms joined at a common junction, one of each pair of said arms including hook means thereon spaced from said junction; and
    means for fastening portions of sheet material within said fork member such that fastening forces applied to the sheet material portions are proportional to tensile forces in the respective sheet material portions, said means for fastening within said fork member including two keeper members each having a substantially planar body, each of said substantially planar bodies having two ends, one end holding a sheet material portion against one of said hook means and an other end holding a sheet material portion against the inner side of an other arm of each of said pairs of said arms such that fastening forces are applied to the sheet material portions by said other ends of said bodies in proportion to the tensile forces in the sheet material portions, distances between said respective ends of said bodies being greater than maximal spacings between said respective arms, and being less than distances between said respective hook means and said respective common junctions, so that said keepers may adopt locking positions wherein said keepers are pulled in the same directions as the tensile forces in the respective sheet material portions, thereby causing said ends of said body to apply the fastening forces.

8. A fastening means as claimed in claim 7, wherein said keeper members each include a resilient, outwardly extending finger integral with said body.

9. A fastening means as claimed in claim 8, wherein said fingers extend a distance from said other ends of said bodies, respectively, which is less than a maximal spacing between each of said pairs of said arms of said fork member to enable removal of said keeper members from said fork member.

10. A fastening means as claimed in claim 7, further comprising:
    means for fastening said fork member to the fixture.

11. A fastening means as claimed in claim 7, wherein said other arms of said fork member are formed with substantially planar inner sides to enable the sheet material portions to extend generally contiguously with inner sides of said other arms.

* * * * *